Figure 1:
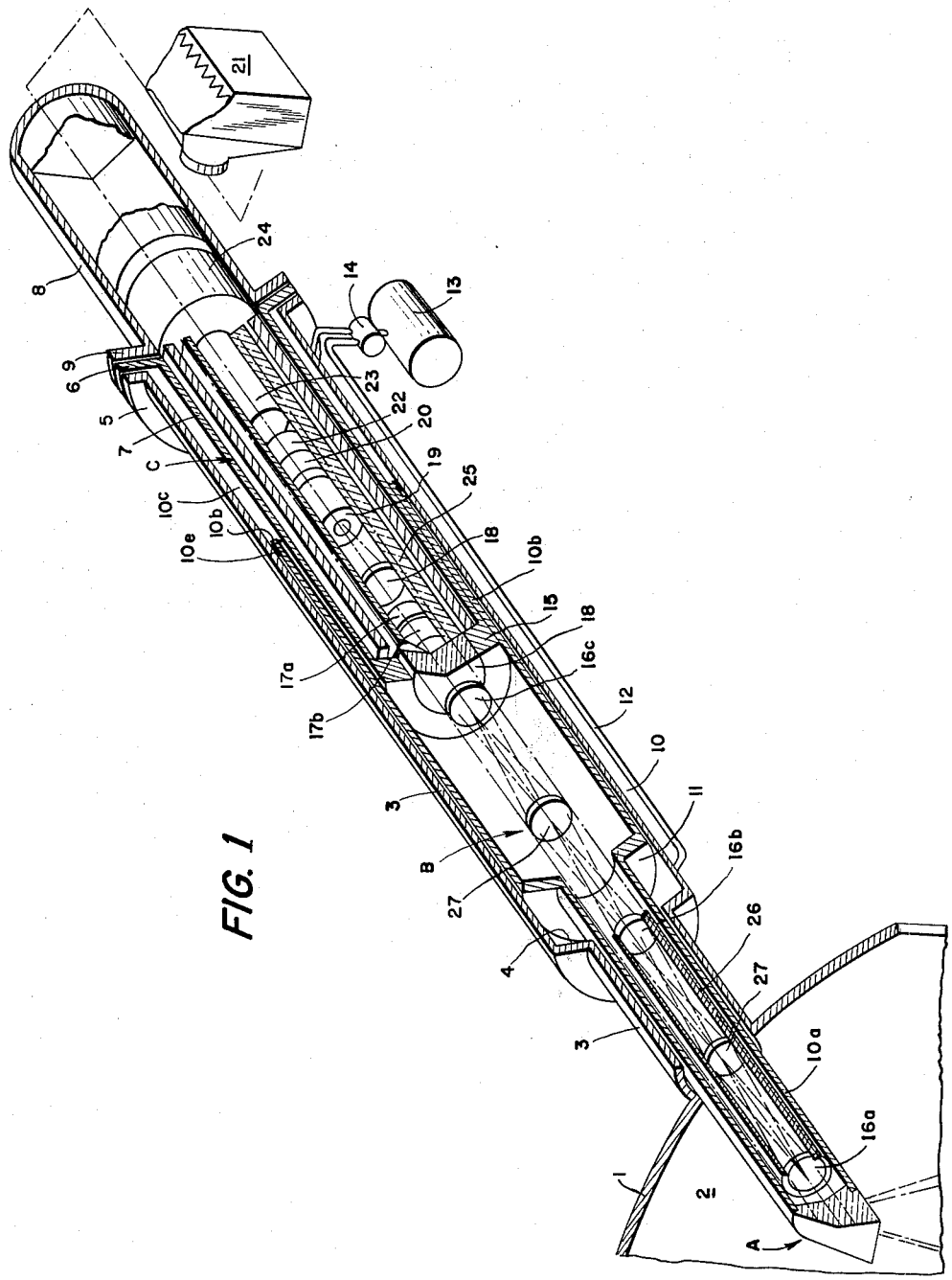

Jan. 18, 1966  J. H. ELLINGER  3,229,577
PERISCOPE HAVING TELESCOPING SECTIONS FOR
VIEWING REACTOR INTERIOR

Filed April 16, 1962 2 Sheets-Sheet 1

INVENTOR
JOHN HENRY ELLINGER

BY Larsen and Taylor

ATTORNEYS

Jan. 18, 1966     J. H. ELLINGER     3,229,577
PERISCOPE HAVING TELESCOPING SECTIONS FOR
VIEWING REACTOR INTERIOR
Filed April 16, 1962     2 Sheets-Sheet 2

INVENTOR
JOHN HENRY ELLINGER

BY *Larson and Taylor*

ATTORNEYS 3,229,577
PERISCOPE HAVING TELESCOPING SECTIONS
FOR VIEWING REACTOR INTERIOR
John Henry Ellinger, Bournemouth, England, assignor to United Kingdom Atomic Energy Authority, London, England
Filed Apr. 16, 1962, Ser. No. 187,501
Claims priority, application Great Britain, Apr. 21, 1961, 14,607/61
7 Claims. (Cl. 88—72)

This invention relates to periscopes. The invention is chiefly concerned with periscopes for viewing objects located within and obscured by an outer structure. In industrial or experimental plant connected for example with the chemical industry or radioactive installations it is sometimes necessary to observe the behaviour of objects which cannot be approached without hazard and are normally obscured by structures of one kind or another. Periscopes have been used in this application hitherto, but so far as is known no adequate viewing system has been made which will function satisfactorily and allow ready maintenance of the moving parts of the system.

Moreover, if the operational conditions are difficult, then in order to preserve the life of the object lens it is necessary to withdraw the object lens from its operational position when not in use. However, this involves making the part carrying the object lens slidable, and if the periscope is used to inspect the interior of a vessel containing superatmospheric pressure, then there is a possibility that variations in the magnitude of that pressure will effect movement of the periscope or that part thereof which extends into the interior of the vessel.

According to the invention, there is provided a periscope for viewing the interior of a pressure vessel containing superatmospheric pressure. The periscope comprises means defining an aperture in the wall of the vessel, a tubular extension extending from said means defining said aperture, a tube carrying an object lens, said tube being slidable in said extension in a telescopic manner, the tube being movable between a first position in which it is withdrawn into said extension and a number of other positions in which the object lens protrudes into the vessel, means containing the pressure against leakage when the tube is in a fully retracted position and means defining a small leak when the tube is moved from the fully retracted position so that pressure fluctuations in the vessel do not move the tube.

Means may be provided for selecting any particular segment by rotating a deviated lens system.

Where parts to be viewed require external illumination, this may be provided by an illumination system with the periscope casing.

The periscope incorporates an object lens system whose components do not move relative to one another.

Figure 2A:
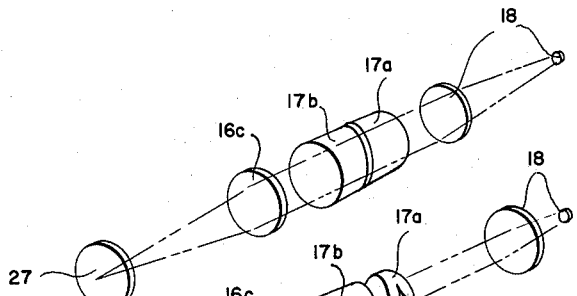
Figure 2B:
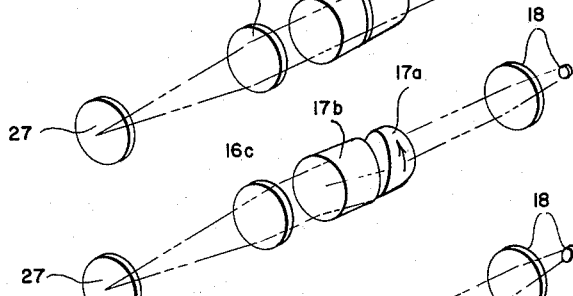
Figure 2C:
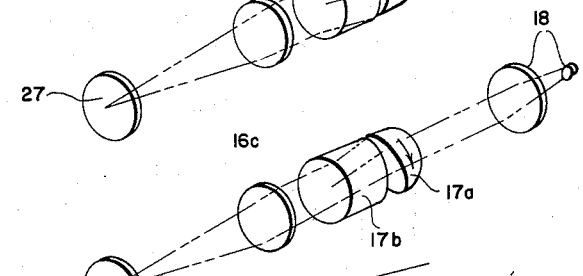
Figure 3:
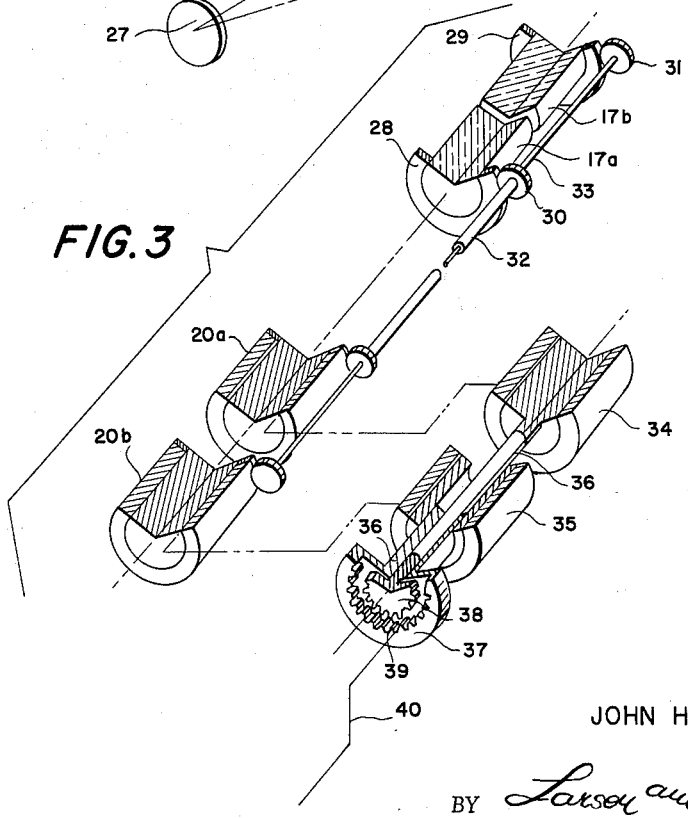

The invention will now be described with reference to the accompanying drawings in which, FIG. 1 shows a periscope embodying the invention, FIGS. 2a, 2b and 2c are diagrammatic views of a part of the optical system shown in FIG. 1, and FIG. 3 is a diagrammatic perspective view of mechanism in FIG. 1.

In FIG. 1 the wall 1, part only of which is shown, of a pressure vessel encloses within volume 2, at superatmospheric pressure a nuclear reactor. The wall 1 has an integral external tubular extension 3 an aperture in the pressure vessel wall the diameter of which is stepped to provide an internal shoulder 4 and which has a terminal portion having end flange 5. The latter abuts a flange 6 of a re-entrant tube 7. An elongated end cover 8 has a flange 9. The flanges 5 and 6 are bolted together and the flange 9 is bolted separately to flange 6 to give a high efficiency seal.

Within the extension 3, a tube 10 is telescopically mounted. The end 10a of the tube 10 can protrude into the volume 2 and carries an object prism A. The tube 10 is stepped to a larger diameter to present a shoulder 11 adjacent the shoulder 4. The end 10b of the tube 10 enters the annular space 10c between the extension 3 and the reentrant tube 7. An annular sliding seal 10e is provided at the free end of the tube 10b which contains a pressure equal to that within the pressure vessel, e.g. about 20 atmos. in the fully retracted position only. A controlled leakage path is formed with the seal 10e at the free end 10b of the tube 10 (between the tube 10 and the inner face of the tubular extension 3), when the tube 10 is moved away from the fully retracted position, such that pressure within the tube 10 is approximately equal to that superatmospheric pressure obtaining in the pressure vessel. In this way pressure changes within the vessel will not cause movement of the telescopically slidable tube 10. The space between shoulders 4 and 11 forms an annular cylinder with respect to which the shoulder 11 serves as a piston in response to pressure fluid admitted to the cylinder, via pipe 12 from a source 13 under control of a valve 14. The pipe 12 is preferably formed by a channel between extension 3 and a ported liner (not shown on the drawing).

The optical system

The optical system consists essentially of a rigid nose prism A viewing the entire reactor core and projecting the image of 90° through three image lenses 16a, 16b (movable with tube 10) and 16c (fixed) of the telescope system through a window 15 which closes the end of tube 7 (thus forming a second containment through which no mechanical drives pass) to rotary optical wedges 17a, 17b and thence through a magnification lens system 18 adjustable to give two degrees of magnification to a fixed television camera 19.

The purpose of the wedges 17a, 17b is twofold. If the faces are fully aligned as shown diagrammatically in FIG. 2a, the image rays will travel straight through the wedge and be focussed at low magnification on the camera viewing the whole reactor core. The magnification lens 18 will be axially disposed to yield only low magnification of the image. When the observer wishes to observe more closely a particular part of his field of view, he is able to select this part by manipulation of the wedges (in a manner already known) and increase the magnification of the selected part by appropriate axial movement of the lens 18.

To select the required part of the field, the wedges 17a, 17b are rotated relative to one another and so allowed to move rotatably as indicated in FIG. 2B so that the rays are displaced from the straight axial path. Hence, according to the degree of displacement, a section of the field radially offset from the axis is presented to the camera. Having selected the amount of radial offset, both wedges may be rotated as one to move the field at the selected radius about the axis. When the wedges have been rotated through the desired angle the magnifying lens system 18 is moved by means not shown in order to increase the magnification of the field of view. The rotation of the wedges relative to each other and of the wedge system as a whole is controlled by two motors 20 forming the receiver of a synchro whose position is controlled by transmitters on a control table and indicated on a stereo screen 21 optically linked to the TV camera to indicate the precise position of the viewed image.

FIG. 3 shows a mechanism for rotating the wedges in which the wedges 17a, 17b are attached to annular gears 28, 29 mating with pinions 30, 31 respectively. The pinions are rotated by receiver synchros 20a, 20b through concentric shafting 32, 33.

The synchros 20a, 20b follow the movement of transmitter synchros 34, 35 mounted on a control table. The synchros 34, 35 have rotors controlled by concentric drive 36 rotated by annulus 37 and external teeth on the disc 38 are engaged by a pinion 39 mounted on the adjacent end of a handle 40; such that on rotation of the latter the annulus 37 and disc 38 rotate differentially.

The radial sector of the field to be viewed is selected by controlled differential rotation of the wedges which is effected by rotating the pinion 39 on its own axis, thus causing a differential motion between annular rotor of the synchro 35 and the rotor of synchro 34. This rotation is transmitted via follower synchros 20a, 20b to wedges 17a, 17b.

Selection of a peripheral area of the field of view is controlled by locking the handle 40 against rotation on its own axis and rotating both disc and annulus together in the same sense.

The focussing lens system 18 is moved in a similar manner axially by a third motor 22.

*The illuminating system*

The source of illumination is preferably an electronic flash light 23 with which its associated electronic equipment 24 located concentrically with the optical and TV system, but behind it to avoid glare and interference. The intermittent flash is viewed on the fluorescent screen 21 whose retentive properties are utilised to act as a light capacitor thus yielding a continuous display of information. This means of illumination has a lower heat output than conventional arc illumination, which is an important consideration at a point close to the heat sensitive TV camera. Light is ducted through the periscope optical system, either by annular lenses, glass tubes or by quartz rods 25 and 26 these systems providing a reasonably glare free concentric viewing of the core. A focussing system will be required to span the distance of the telescoping section. The prism A deflects the light onto the core, which light must be sufficiently powerful to provide illumination at the higher magnification. The light is gathered and conveyed to the camera by a condensing lens system 27 which should minimise the required light input. The system 27 is located at the focal points of the image rays. In FIG. 1 the image rays are shown chain dotted, the illumination rays double chain dotted and the reflected light rays dotted.

*The television system*

Conventional closed circuit television equipment is used as far as possible but a high line system is desirable. The system should be suitable for stereo television preferably on a single screen to give the operator simultaneous visibility of the screen and his control panel, thus avoiding "blind" operations of the control system.

In addition, facilities could be provided for video tape recording should accident conditions make recorded maintenance advantageous to the user. Means may be provided which are responsive to a pressure rise or high temperature rise due to accident conditions within the pressure vessel and operable to initiate a permanent video recording of the field of view.

*Cooling system*

The need to keep the temperature of the television camera below 60° C. may require a compact cooling system for the camera, motorised optical system and the light source. To avoid bulky equipment and difficult piping, the proposed system uses an evaporative heat exchanger and a compact refrigerating system for the evaporative fluid and provides some heat capacity which would provide a delay period if temperature conditions should be subject to sudden fluctuations. An example of one such system is shown in British Patent No. 933,822.

*The telescoping equipment*

The telescopic part of the system performs the following functions:

(a) It is capable of providing a low pressure seal (say 20 lb. per inch$^2$) for the lens system which will permit the exchange of lenses without fully depressurising and purging the reactor. Thus the moving tube 10 provides a diaphragm type of seal which will seal the system adequately during the bi-annual lens maintenance.

(b) It supports mirrors and lenses rigidly in predetermined positions without the need for incorporating any mechanical or electrical equipment which would be liable to more frequent maintenance.

Means may be provided for shielding the object prism against heat or radiation when extended into the vessel. This can comprise a plug carried on a tube within the end 10a of tube 10 and mounted so as to transmit cantilever reactions (due to the weight of the plug) to the periscope casing without deforming the optical system.

The rigid part of the system performs the following functions:

(a) It rigidly locates all optical and electrical equipment mounted on a common frame to facilitate maintenance.

(b) It provides a full reactor working pressure seal (20 atmos.) to permit the exchange of an equipment assembly for maintenance without depressurising the reactor. The system is capable for providing the reaction to pressure applied, when expanding the telescope into the reactor.

Both systems may be enclosed within a stainless steel liner (not shown) of minimum wall thickness to ensure smooth operation without relying on the fine machining of the pipe forming part of the reactor pressure vessel. The telescope is moved by applying excess gas pressure either outside or inside the tube supporting the lenses, utilising pressure source 13 and valve 14.

A bleed system (not shown) should be provided to connect the two containments.

Constructionally the periscope comprises three major components or assemblies of components A, B and C each arranged so as to have a degree of accessibility, for maintenance according to its operational reliability. These are:

A—a single glass or quartz object prism of high reliability.

B—an assembly of medium reliability, the telescopic tube 10 and its associated optical equipment which comprises a series of rigidly installed lenses of the mechanically operated optical system providing at least 10 interfaces subject to "browning." A two yearly maintenance cycle may be desirable to avoid excessive loss in light to and from the reactor core. To replace the lenses within the tube 10, the latter has only to be moved fully to the right as viewed in FIGURE 1 so that the free end 10b of the tube engages the inwardly projecting portion of the flange 6, so forming a seal. The flanges 9 and 6 can then be separated whilst the pressure within the pressure vessel is substantially contained by the seal so formed. In some cases, however, depending upon the pressure within the vessel, some depressurization of the vessel may be necessary.

C—mechanically operated optical systems electronic, television and cooling systems which are grouped in a second containment 7. This is designed to withstand full reactor pressure so that no depressurisation is required to maintain the equipment, which need therefore be only of low reliability.

All systems are free of rotary seals which would provide difficult maintenance. This yields advantages as sensitive equipment is removed as far as possible from operation conditions, which could accelerate failure as reliability of the system is increased. Within these limitations maximum operative facilities are provided:

(a) by providing two different magnifications (b) by providing facilities for stereo vision on a common screen (c) by providing two alternative positions of the telescopic tube 10 for viewing and storage respectively (d) the optical system will be protected against radiation and heat damage by about 6 inches thickness of screening whilst the reactor is operating and the telescope is withdrawn.

I claim:

1. A periscope for observing the interior of a pressure vessel comprising first tubular means extending from an aperture in a wall of said pressure vessel and defining said aperture, said first tubular means rigidly attached to said wall with a pressure-tight connection, second tubular means slideable within said first tubular means from a fully retracted position in which a first end of said second tubular means is withdrawn into said first tubular means beyond said aperture and said pressure vessel, to a fully extended position in which said first end is extended through said aperture and inside said pressure vessel, said second tubular means carrying an object lens in the end which is protruded inside said pressure vessel, sealing means, said sealing means sustaining the pressure in said vessel against leakage when said second tubular means is in the fully retracted position and allowing a small leak when said second tube is moved away from said fully retracted position so that pressure fluctuations in said pressure vessel do not move said second tubular means.

2. A periscope according to claim 1 wherein each of said first and second tubular means comprises first and second portions, said second portion being of larger diameter than said first portion and attached to said first portion by an annular shoulder in a pressure-tight connection, and said first and second portions of said first and second tubular means cooperating respectively in their slideable relationship, fluid inlet means in the wall of said first tubular means positioned such that the pressure may be varied between the annular shoulders of said first and second tubular means to effect sliding motion to said second tubular means.

3. A periscope according to claim 2 wherein said periscope further comprises annular first flange means rigidly attached in a pressure-tight connection to the extended end of the second portion of said first tubular means, the end of said second portion of said first tubular means defining the annulus of said annular first flange, third tubular means of smaller diameter than the second portion of said second tubular means and positioned inside said first tubular means and shorter in length than the second portion of said first tubular means, second annular flange means rigidly attached with a pressure-tight connection to one end of said third tubular means, said second annular flange attached in sealed engagement with said first annular flange, a cylindrical container for the image-forming components of the optical system of said periscope, said cylindrical container being attached to said second annular flange means and extending in a direction away from said third tubular means.

4. A periscope according to claim 3 wherein the second portion of said second tubular means is slideable between the walls of said first and third tubular means and wherein said sealing means comprises a slideable seal at the end of the second portion of said second tubular means coacting with the surfaces of said first and second tubular means.

5. A periscope for inspecting the interior of a pressure vessel containing gas at super atmospheric pressure comprising a means defining an aperture in the wall of the pressure vessel, a tubular extension formed around the said means and projecting externally of the vessel, said extension having a stepped diameter portion defining an enlarged tubular portion terminating in a flange, a second tube having an externally flanged open end and an end closed by an optical lens, means securing the flanged end of said second tube to said flange on said tubular extension, the outside diameter of said second tube being small enough to allow entry into said extension and defining an annular clearance therebetween, a slidable tube of the same shape as said extension and mounted for sliding movement within said extension and carrying an object lens at one end, the other end being moveable within said annular clearance, a source of pressure fluid, ducting communicating the source with inlets at axially spaced positions on the tubular extension to allow pressure fluid to be applied to move said slidable tube telescopically, sealing means providing a controlled leakage path between said slideable tube and said annular clearance, two cylindrical coaxial optical wedges mounted end to end with their inclined faces adjacent, said optical wedges being axially aligned with the optical path of said periscope.

6. A periscope according to claim 5 wherein means are provided for rotating said optical wedges as a unit.

7. A periscope according to claim 5 wherein means are provided for rotating said optical wedges relative to one another.

References Cited by the Examiner

UNITED STATES PATENTS

| | | | |
|---|---|---|---|
| 1,529,225 | 3/1925 | Strang | 88—72 |
| 2,093,604 | 9/1937 | Gallasch | 88—39 |
| 2,975,668 | 3/1961 | Eckel | 88—72 X |
| 3,052,151 | 9/1962 | Clave et al. | 88—72 X |

FOREIGN PATENTS

| | | |
|---|---|---|
| 1,165,448 | 6/1958 | France. |
| 125,523 | 4/1919 | Great Britain. |
| 819,523 | 9/1959 | Great Britain. |

JEWELL H. PEDERSEN, *Primary Examiner.*

J. L. CHASKIN, R. F. WIBERT, *Assistant Examiners.*